(12) United States Patent
Yin et al.

(10) Patent No.: US 9,460,207 B2
(45) Date of Patent: Oct. 4, 2016

(54) AUTOMATED DATABASE GENERATION FOR ANSWERING FACT LOOKUP QUERIES

(75) Inventors: Xiaoxin Yin, Bothell, WA (US); Wenzhao Tan, Redmond, WA (US); Chao Liu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 856 days.

(21) Appl. No.: 12/962,677

(22) Filed: Dec. 8, 2010

(65) Prior Publication Data

US 2012/0150838 A1 Jun. 14, 2012

(51) Int. Cl.
*G06F 17/30* (2006.01)
(52) U.S. Cl.
CPC .............. *G06F 17/30864* (2013.01)
(58) Field of Classification Search
USPC ........................................ 707/711
See application file for complete search history.

(56) References Cited

U.S. PATENT DOCUMENTS

| | | | |
|---|---|---|---|
| 8,239,751 B1 * | 8/2012 | Rochelle et al. | 715/220 |
| 2006/0173834 A1 * | 8/2006 | Brill et al. | 707/4 |
| 2007/0094285 A1 | 4/2007 | Agichtein et al. | |
| 2007/0150800 A1 * | 6/2007 | Betz et al. | 715/500 |
| 2009/0313247 A1 | 12/2009 | Hogue | |
| 2010/0082694 A1 * | 4/2010 | Corsi et al. | 707/798 |
| 2010/0185654 A1 * | 7/2010 | Fortuna | G06F 17/30011 707/769 |
| 2010/0325133 A1 * | 12/2010 | Rounthwaite et al. | 707/759 |

OTHER PUBLICATIONS

"GoogleLookup: Creating a Google Fact Engine Directory", Retrieved at << http://blog.ouseful.info/2008/10/16/ >>, Oct. 16, 2008, pp. 1-9.
Agichtein, et al., "Question Answering over Implicitly Structured Web Content", Retrieved at << http://citeseerx.ist.psu.edu/viewdoc/download?doi=10.1.1.84.9981&rep=rep1&type=pdf >>, ACM International Conference on Web Intelligence, Nov. 2-5, 2007, pp. 1-8.
Ahn, et al., "Quartz: A Question Answering System for Dutch", Retrieved at << http://staff.science.uva.nl/~mdr/Publications/Files/clef2006-proc-qa.pdf >>, Evaluation of Multilingual and Multi-modal Information Retrieval, 7th Workshop of the Cross-Language Evaluation Forum, CLEF, Sep. 20-22, 2006, pp. 362-371.
Defazio, Aaron., "Natural Language Question Answering Over Triple Knowledge Bases", Retrieved at << http://cs.anu.edu.au/student/projects/09S2/Reports/Aaron%20Defazio.pdf >>, Oct. 30, 2009, pp. 1-42.
Raghavan, et al., "Evaluating Entity Models on the TREC Question Answering Task", Retrieved at << http://maroo.cs.umass.edu/pub/web/getpdf.php?id=484 >>, CIIR Technical Report, 2004, pp. 1-9.

(Continued)

*Primary Examiner* — Amresh Singh
(74) *Attorney, Agent, or Firm* — Alin Corie; Sandy Swain; Micky Minhas

(57) ABSTRACT

Technologies pertaining to fact lookup queries are described herein. A relational database is automatically built by extracting attribute identities and attribute values from a one dimensional table, wherein the one dimensional table does not include an entity identity that corresponds to the attribute identity and the attribute value. The entity identity is inferred, and the attribute value is indexed in a relational database by the entity identity and the attribute identity. When a query is issued by a user that includes the entity identity and the attribute identity, the corresponding attribute value in the relational database is returned to the user.

20 Claims, 10 Drawing Sheets

(56) References Cited

OTHER PUBLICATIONS

Cucerzan, et al., "Factoid Question Answering over Unstructured and Structured Web Content", Retrieved at << http://citeseerx.ist.psu.edu/viewdoc/download?doi=10.1.1.61.1078&rep=rep1&type=pdf >>, Proceedings of the Fourteenth Text REtrieval Conference, TREC, Nov. 15-18, 2005, pp. 1-6.

Brill, et al., "An analysis of the AskMSR question-answering system", Retrieved at << http://research.microsoft.com/en-us/um/people/sdumais/EMNLP_Final.pdf >>, 2002, pp. 1-8.

Harabagiu, et al., "Experiments with Open-Domain Textual Question Answering", Retrieved at << http://acl.ldc.upenn.edu/C/C00/C00-1043.pdf >>, 18th International Conference on Computational Linguistics, Proceedings of the Conference, Jul. 31-Aug. 4, 2000, pp. 292-298.

Tellex, et al., "Quantitative Evaluation of Passage Retrieval Algorithms for Question Answering.", Retrieved at << http://groups.csail.mit.edu/infolab/publications/Tellex-etal-SIGIR03.pdf >>, Proceedings of the 26th Annual International ACM SIGIR Conference on Research and Development in Information Retrieval, Jul. 28-Aug. 1, 2003, pp. 1-7.

Cafarella, et al., "Uncovering the relational web.", Retrieved at http://citeseerx.ist.psu.edu/viewdoc/download?doi=10.1.1.140.5666&rep=rep1&type=pdf >>, 11th International Workshop on the Web and Databases, WebDB, Jun. 13, 2008, pp. 1-6.

Wang, et al., "A machine learning based approach for table detection on the web.", Retrieved at << http://www.research.ibm.com/people/j/jyhu/www2002.pdf >>, 2002, pp. 1-9.

Yin, et al., "Automatic Extraction of Clickable Structured Web Contents for Name Entity Queries.", Retrieved at << http://research.microsoft.com/pubs/120887/fp0254-yin.pdf >>, Proceedings of the 19th International Conference on World Wide Web, Apr. 26-30, 2010, pp. 1-10.

Cui, et al., "Probabilistic query expansion using query logs", Retrieved at << http://citeseerx.ist.psu.edu/viewdoc/download?doi=10.1.1.5.6773&rep=rep1&type=pdf >>, Proceedings of the eleventh international conference on World Wide Web, May 7-11, 2002, pp. 1-8.

* cited by examiner

FIG. 5

| RELATIONAL DATABASE | |
|---|---|
| ENTITY ID 1, ATTRIBUTE ID 1 | ATTRIBUTE VALUE 1 |
| ENTITY ID 1, ATTRIBUTE ID 2 | ATTRIBUTE VALUE 2 |
| ... | ... |
| ENTITY ID 1, ATTRIBUTE ID N | ATTRIBUTE VALUE N |
| ... | ... |
| ENTITY ID M, ATTRIBUTE ID Y | ATTRIBUTE VALUE Z |
| ... | ... |

500

AUTOMATED DATABASE GENERATION FOR ANSWERING FACT LOOKUP QUERIES

BACKGROUND

Conventional search engines support a variety of different types of queries. These queries include informational queries, navigational queries and transactional queries. An informational query is a query submitted by a user, wherein the user is searching for general information about some entity. An example of an informational query may be "Washington", where the issuer of the query desires to obtain information about the state of Washington. A navigational query is a query issued by the user when the user wishes to find a particular web site or web page. For example, a user wishing to be provided with a web page corresponding to a bank may issue a query of the name of the bank. A transactional query is a query that reflects the intent of the issuer of the query to perform a particular action like purchasing an automobile, downloading a screensaver, or the like.

Search engines are currently being adapted to additionally support fact lookup queries. A fact lookup query is a query that is issued by a user when the intent of the user is to acquire a certain fact about a particular entity. When a fact lookup query is submitted by a user, it is desirable to present a single correct answer to the user rather than a plurality of web pages that may include the correct answer. Examples of fact lookup queries include "population of the state of Washington," "date of birth of Babe Ruth," etc. Answering these fact lookup queries through utilization of a search engine has been widely studied in information retrieval and natural language processing. Currently, the focus on answering fact lookup queries has been on natural language processing.

Utilizing natural language processing to perform searches based on fact lookup queries has proven to be a suboptimal solution for a variety of reasons. For example, issuers of queries oftentimes do not submit queries that conform to natural language processing. For instance, rather than issuing the query "what is the capital of Morocco?" searchers tend to issue queries such as "capital of Morocco." In this case, since the user has not issued an appropriate natural language query, natural language processing may not provide an optimal result. Additionally, most query answering systems based on natural language processing do not have the ability to distinguish fact lookup queries from other queries, and try to answer every query as a fact lookup query. In web search, however, a relatively small portion of queries are fact lookup queries, while the majority of queries are navigational queries, transactional queries, or informational queries. If a web search engine assumes that each issued query is a fact lookup query, the search engine will often provide irrelevant search results to the user.

SUMMARY

The following is a brief summary of subject matter that is described in greater detail herein. This summary is not intended to be limiting as to the scope of the claims.

Described herein are various technologies pertaining to automatically generating a relational database that comprises data that can be utilized to recognize and answer fact lookup queries. Additionally, described herein are various technologies pertaining to receiving a query and providing an instant answer to the query through utilization of the aforementioned relational database. To automatically generate such a relational database, source code of a plurality of web pages (e.g., web pages indexed by a search engine) can be received and analyzed. A web page in the plurality of web pages may include a one dimensional table with two columns and one or more rows, wherein each row of the one dimensional table includes an identity of an attribute that corresponds to a particular entity and a value for such attribute. It is to be ascertained, however, that the one dimensional table is free of (does not include) an identity of the entity. The attribute identity and the attribute value can be extracted from the one dimensional table, and the entity identity that corresponds to the attribute identity and the attribute value can be inferred from other parts of the web page.

The entity identity can be inferred through utilization of a variety of approaches. In a first example, query logs can be analyzed to ascertain which queries were issued by users to reach the web page that includes the one dimensional table. Keywords in such queries can be analyzed and compared with keywords in the URL of the web page, keywords in the title of the web page, keywords in the header of the web page, keywords in the body of the web page, etc. If there is significant commonality between keywords in the query and keywords resident on the web page, it can be inferred that the commonly occurring keywords represent the entity identity. Another exemplary approach for inferring an entity identity pertains to learning a schema (which can be referred to as an "HTML wrapper") corresponding to a particular web site or type of web page and inferring the entity identity based at least in part upon this known schema. Pursuant to an example, a web site may be utilized to sell a plurality of different products, and each web page in the web site may correspond to a different product. It can be learned (e.g., automatically or manually) that an entity identity is consistently at a particular location in the source code of web pages that belong to the web site. Thus, by having knowledge of the schema of similar web pages, the entity identity corresponding to the web page can be inferred.

This extraction of attribute identities and attribute values and inference of entity names can be undertaken for a plurality of web pages, thus resulting in the creation of a relatively large source of data. This collection of data can be arranged in the form of a relational database such that attribute values are indexed by, for instance, entity identities and attribute identities. Accordingly, if a user entered the query "population of Ohio," then the attribute identity is population, the entity identity is Ohio and an attribute value corresponding to that entity identity and attribute identity can be retrieved from the relational database.

To increase robustness of a search engine that is configured to answer fact lookup queries, entity identities and attribute identities that are equivalent to those that are extracted from web pages and/or inferred can be inferred. For example, the entity identity Ohio may be identical to the entity identity OH. Thus, for instance, a user that issues a query "population of Ohio" is searching for the same factual information as a user that issues a query "population of OH." As will be described herein, query logs can be analyzed to determine equivalent entity identities. Furthermore and similarly, two different attribute identities may be directed toward the same attribute. In an example, a user that issues a query "birth date of Babe Ruth" is searching for the same information as a user who issues a query "date of birth of Babe Ruth." Equivalent attributes can be located by reviewing the relational database and locating different attribute identities that usually have the same or substantially similar attribute values for the same entity identity.

In addition, in some instances, multiple different data sources may provide different attribute values for a substantially similar entity identity and attribute identity. For example, a first data source may indicate that the population of the state of Ohio is 11.54 million people while a second data source may indicate that the population of the state of Ohio is 11,542,645. Still another data source may have rounded up and indicated that the population of the state of Ohio is 12 million. Techniques are described herein that pertain to selecting a single attribute value and providing such attribute value as an answer to a fact lookup query.

Other aspects will be appreciated upon reading and understanding the attached figures and description.

BRIEF DESCRIPTION OF THE DRAWINGS

FIG. 5 is an exemplary relational database.

DETAILED DESCRIPTION

Figure 1:
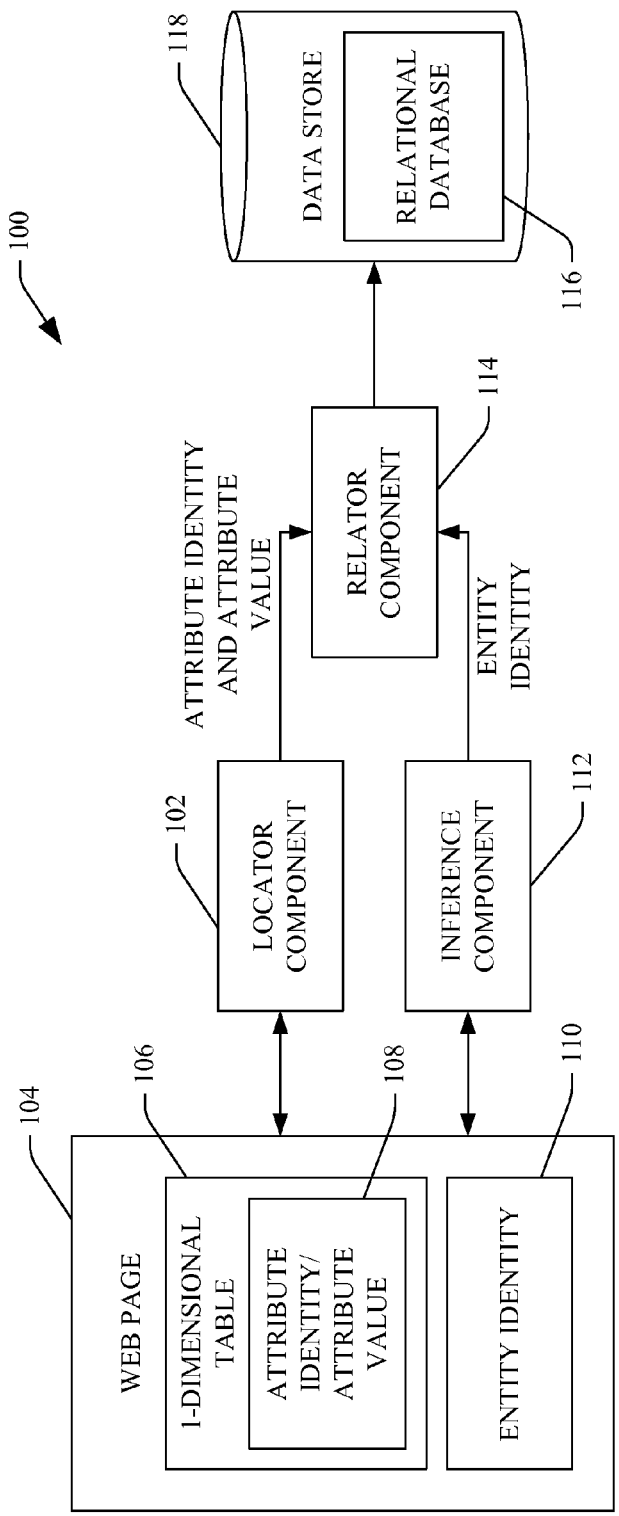
FIG. 1 is a functional block diagram of an exemplary system that facilitates automatically generating data that can be used for answering fact lookup queries.

Various technologies pertaining to building a database that can be employed in connection with answering fact lookup queries will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

With reference to FIG. 1, an exemplary system 100 that facilitates building a relational database that can be employed in connection with answering fact lookup queries is illustrated. A fact lookup query is a query that is provided to a search engine where the intent of a user is to learn some particular fact about an attribute of an entity. Examples of fact lookup queries include "population of Ohio" and "height of Babe Ruth." In the first example, the entity identity is "Ohio" and the attribute identity is "population." In the second example, the entity identity is "Babe Ruth" and the attribute identity is "height." It can be ascertained that these fact lookup queries are markedly different from navigational queries, transactional queries, and/or informational queries. Navigational queries are queries issued by a user for the purpose of navigating to a particular web page, such as the web page of a bank of the user. A transactional query is a query issued by the user for the purpose of performing some sort of transaction, such as purchasing an automobile. An informational query is a query issued by the user for the purpose of obtaining general information about a subject. For example, an informational query may be "Babe Ruth," where the issuer of the query wishes to obtain general information about Babe Ruth. It can be ascertained that it may be desirable to the issuer of a fact lookup query to be provided with an instant answer—that is, a single answer to the fact lookup query, rather than a plurality of links to web pages that may include such answer.

The system 100 comprises a locator component 102 that can receive a web page 104. More specifically, the locator component 102 can receive source code of the web page 104. The source code of the web page 104 includes a one dimensional table 106, wherein the one dimensional table comprises an attribute identity and an attribute value 108. For instance, the one dimensional table 106 can include at least one row and two columns, wherein the first column comprises the attribute identity and the second column comprises the attribute value. The one dimensional table 106, however, is free of (does not include) an entity identity that corresponds to the attribute identity and attribute value 108 in the one dimensional table 106. In an example, the source code of the web page 104 may include an entity identity 110 that corresponds to the attribute identity and attribute value 108, wherein the entity identity 110 may be in a URL of the web page 104, a title of the web page 104, a header of the web page 104, or in a body of the web page 104. For instance, an attribute identity may be "height" and an attribute value may be 5'10". In another example, the attribute identity may be "population" and the attribute value may be 3.5 million. Many of these one dimensional tables that include attribute identities and attribute values are available on the web, but due to lack of entity identity corresponding thereto, have heretofore not been employed in connection with answering fact lookup queries.

The system 100 further comprises an inference component 112 that can infer the entity identity 110 that corresponds to the attribute identity and attribute value 108. The inference component 112 can infer the entity identity 110 utilizing a variety of approaches that will be described in greater detail herein. A first approach involves reviewing queries submitted by users to a search engine to reach the web page 104, and comparing content of the queries with the URL of the web page 104, a title of the web page 104, a header of the web page 104 and/or content of the web page 104 to locate commonalities between keywords in the queries and keywords used in association with the web page 104. Another exemplary approach involves having some knowledge of a schema of the web page 104 and inferring the entity identity 110 based at least in part upon the knowledge of the schema.

A relater component 114 can cause the entity identity 110 inferred by the inference component 112 and the attribute identity and the attribute value 108 extracted by the locator component 102 to be retained as corresponding entries in a relational database 116 that resides in a data store 118. For instance, the attribute value can be indexed by the entity identity 110 and the attribute identity (the entity identity 110 and the attribute identity can be indices into a database). Thus, in an example, if the entity identity is "Babe Ruth," the attribute identity is "height," and the attribute value is 6'2", then the value 6'2" may be indexed by "Babe Ruth" and "height."

While the system 100 has been illustrated and described as extracting one dimensional tables from a single web page and inferring an entity identity for the attribute identity and attribute value 108 in the one dimensional table 106, it is to be understood that the locator component 102 and the inference component 112 can perform the above described operations over a plurality of web pages. For instance, the locator component 102, the inference component 112, and the relater component 114 can perform the above-described functions over each web page that is indexed by a particular search engine. When locating one dimensional tables 106 that include attribute identities and attribute values, the locator component 102 can recognize which one dimensional tables include relevant information. For example, many web sites include numerous pages, wherein such pages may include contents in substantially similar formats. The locator component 102 can treat numerous pages belonging to a web site that has identical or similar formats as a singular data source.

The locator component 102 can analyze data from different pages in the data source and can filter out many false positive one dimensional tables. For instance, an HTML page may include tables for HTML display purposes. In an example, the locator component 102 can ascertain that an identical table appears in many pages belonging to a data source and can infer that these one dimensional tables do not provide any information that can be utilized in connection with answering fact lookup queries. Furthermore, the locator component 102 can determine that a table corresponding to a web page in the data source includes attributes that appear in only a single page, and can therefore infer that it is unlikely to be a one dimensional table with an attribute identity/attribute value because an attribute is generally associated with many entities of a same type.

When execution of the system 100 is completed over web pages indexed by a search engine, the resultant relational database 116 comprises a large amount of information. This information includes a plurality of attribute values that are indexed by corresponding entity identities and attribute identities.

Figure 2:
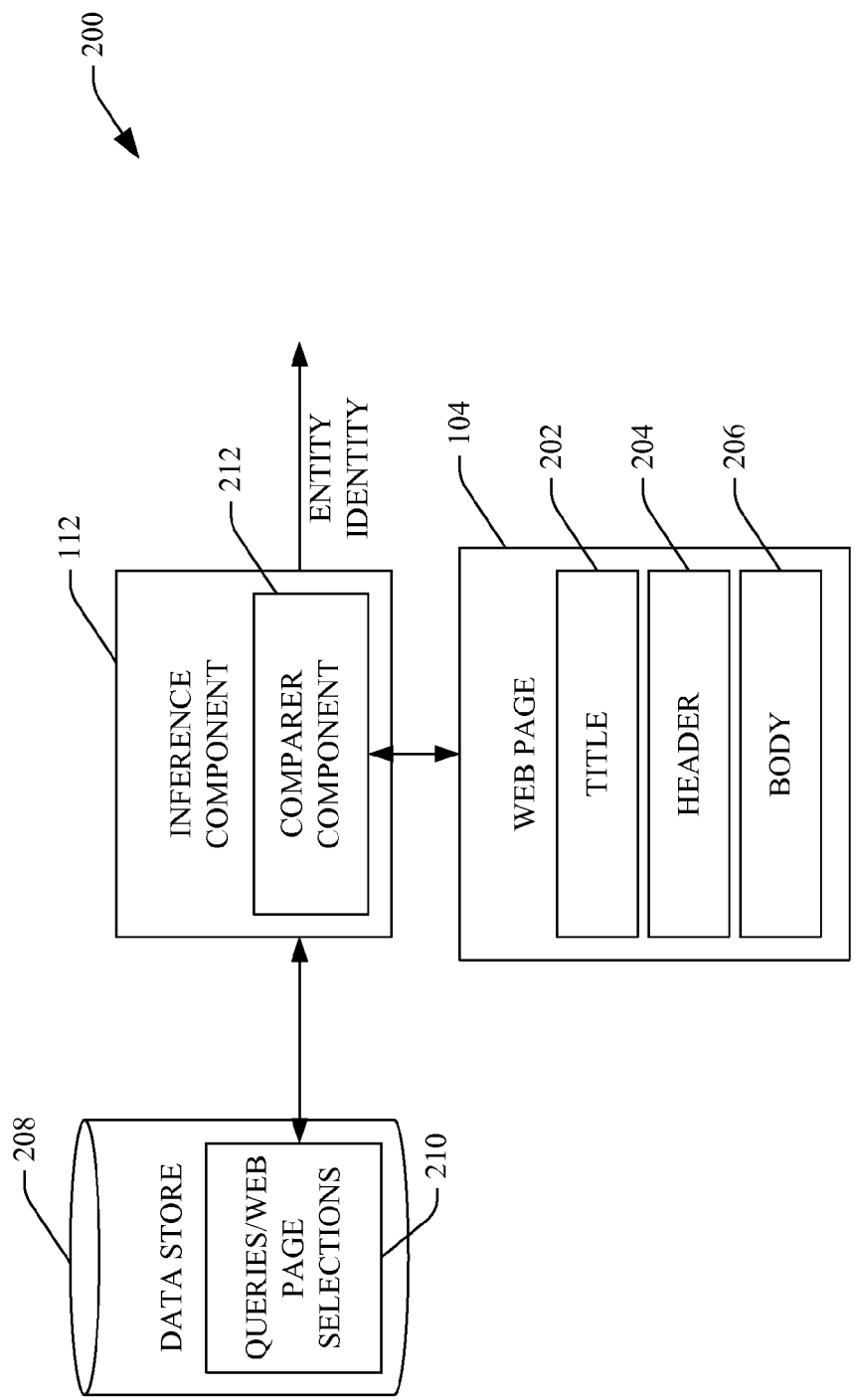
FIG. 2 is a functional block diagram of an exemplary system that facilitates inferring an entity identity that corresponds to an attribute identity and attribute value.

With reference now to FIG. 2, an exemplary system 200 that facilitates inferring an identity of an entity based at least in part upon previous queries proffered by users to arrive at the web page 104 is illustrated. The web page 104 may comprise a URL, a title 202 of the web page 104, a header 204 of the web page 104, a body 206 of the web page 104, amongst other data. Generally, even though an entity identity corresponding to an attribute identity and attribute value in a one dimensional table is not included in such table, the entity identity will be included somewhere else in the web page 104. In the example shown in FIG. 2, the inference component 112 can access a data store 208 that comprises queries and web page selections 210. More specifically, the queries and web page selections 210 include queries that are issued by users of a search engine that were employed by such users to locate and access the web page 104.

The inference component 112 comprises a compare component 212 that compares words in the title 202, header 204 and/or body 206 of the web page 104 with keywords in queries issued by users to access the web page 104. For instance, if the web page 104 is directed toward the life and baseball statistics of Babe Ruth, then users of the search engine may issue queries that include the name Babe Ruth when locating the web page 104. The compare component 212 can analyze the queries issued by the users for keywords occurring most frequently in queries issued by users to access the web page 104. The compare component 212 may then compare such keywords with words in the title 202, header 204, body 206 or other portion of the web page 104 with the frequently occurring keywords in the queries of users. If the frequently occurring keywords used in the queries are included in the web page 104, then the inference component 112 can infer that such words in the web page 104 and the keywords in the query represent the entity identity that corresponds to the attribute identity and attribute value located by the locator component 102 (FIG. 1). As described above, this entity identity can be stored in a relational database in relation to an attribute identity and attribute value extracted from a one dimensional table that exists in the web page 104.

Figure 3:
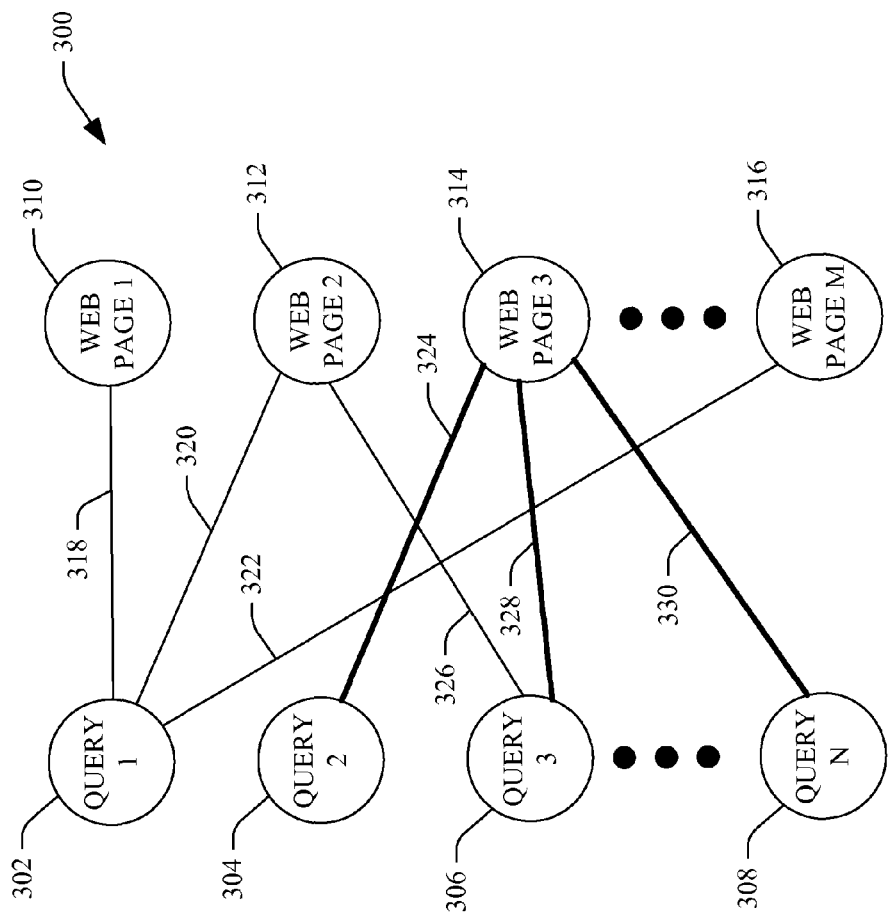
FIG. 3 is an exemplary click graph.

Turning now to FIG. 3, an exemplary click graph 300 is illustrated. The click graph 300 is shown for exemplary purposes to illustrate how queries issued to a search engine are related to web pages returned by such search engine. For instance, the click graph 300 comprises n queries 302-308 that have been issued to a search engine by users of such search engine. The click graph 300 further comprises m web pages 310-316, wherein such web pages 310-316 have been clicked by users of the search engine subsequent to users issuing one or more of the queries 302-308 to the search engine. Thus, for instance, users that issued the first query 302 are shown to have clicked the nth web page 316, the second web page 312 and the first web page 310.

As shown, the click graph 300 is a bipartite graph, wherein the bipartite graph comprises a plurality of edges 318-330. These edges can be weighted to indicate a number of issuances of the query by users and a number of clicks on web pages that are associated with such queries.

Pursuant to an example, the third web page 314 may be a web page of interest, wherein it is desirable to infer an entity identity pertaining to the third web page 314. As can be ascertained, the second query 304, the third query 306, and the nth query 308 have been issued by users of the search engine to locate and select the third web page 314. These queries may utilize common keywords across such queries, and the third web page 314 may include such common keywords in the URL, header, title, or body of the web page. By comparing the keywords of the queries 304, 306 and 308 with the content of the web page 314, an entity identity corresponding to the web page 314 can be inferred. For instance, the second query 304 may be Babe Ruth home runs, the third query 306 may be Babe Ruth RBIs, and the nth query 308 may be Babe Ruth New York Yankees. The content of the third web page 314 may also include the name Babe Ruth. Thus, since the keywords "Babe Ruth" frequently occur in the queries 304, 306, and 308 utilized to access the web page 314, and the web page includes the keywords "Babe Ruth", it can be inferred that the entity identity corresponding to the web page 314 is Babe Ruth.

Figure 4:
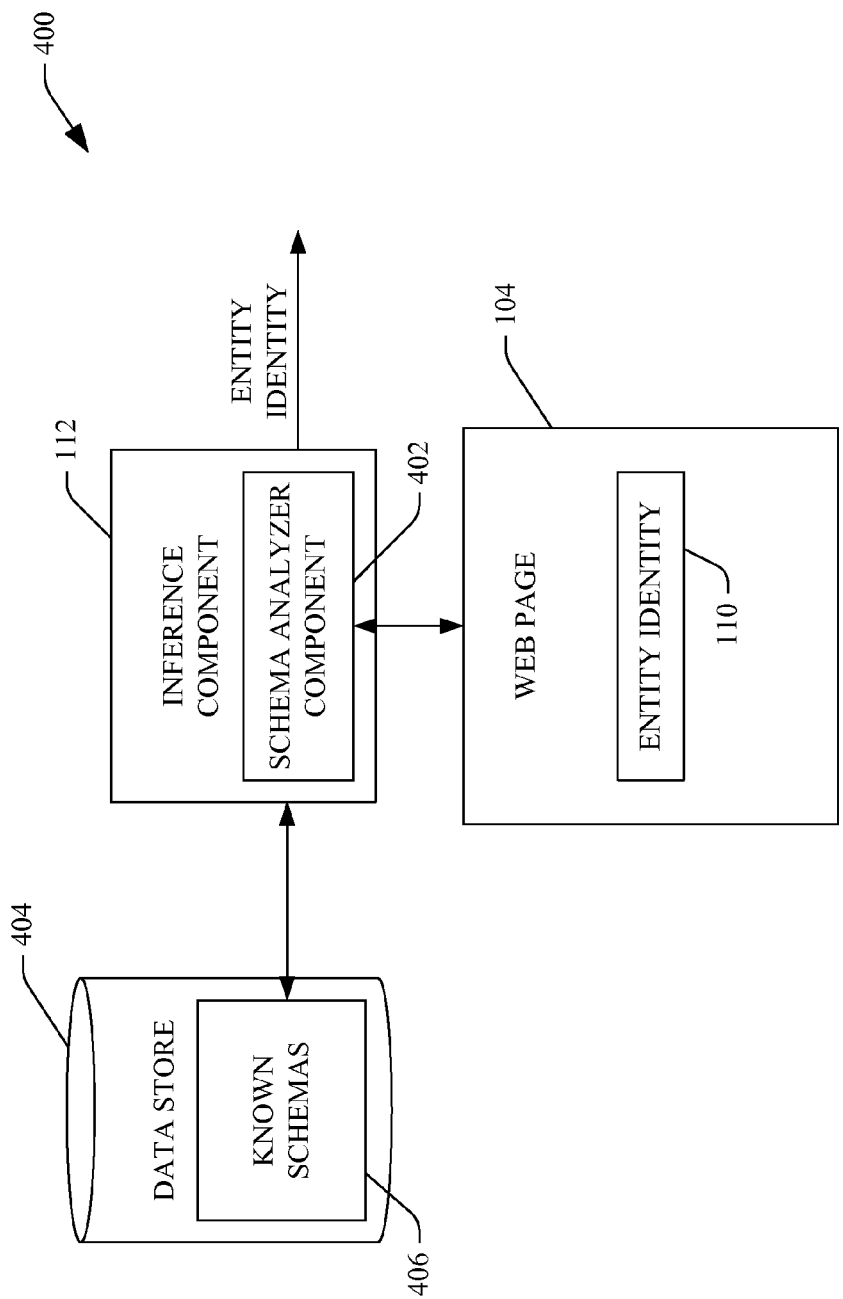
FIG. 4 is a functional block diagram of an exemplary system that facilitates inferring an entity identity that corresponds to an attribute identity and attribute value.

Referring now to FIG. 4, another exemplary system 400 that facilitates inferring an entity identity is illustrated. The system 400 comprises the inference component 112, which is configured to infer an entity identity corresponding to an attribute identity and an attribute value extracted from a one dimensional table in the web page 104. In this example, it is assumed that the entity identity 110 is existent in content of the web page 104. The inference component 112 can comprise a schema analyzer component 402 that can infer the entity identity 110 based at least in part upon a known schema (e.g., a known HTML wrapper) that corresponds to web page 104. More specifically, the system 400 can comprise a data store 404 that includes one or more known schemas for web pages. For instance, the web page 104 may belong to a web site, wherein pages belonging to the web site have a known, common schema. The schema of the web site can be manually expressed by an individual or can be automatically learned through an analysis of web pages belonging to a same web site (domain).

In an example, an online collaborative dictionary may have several web pages that pertain to different entities. It can be known, through a known schema, that each web page belonging to the online collaborative dictionary has the entity identity at a particular position in the title of the web page. Accordingly, the schema analyzer component can access the known schemas 406 and can infer the entity identity 110 based at least in part upon a known schema that corresponds to the web page 104. It is to be understood that either the system 200 (FIG. 2) and/or the system 400 may be used in connection with inferring entity identities from web pages. For instance, the system 200 may be utilized when a plurality of queries have been issued to locate a web page of interest and the system 400 may be utilized when the web page 104 has few queries that have been used to locate such web page 104 through utilization of a search engine.

With reference now to FIG. 5, an exemplary relational database 500 is illustrated. The relational database 500 comprises a plurality of entries, wherein such entries can be attribute values, for example. These attribute values can be indexed by entity identities and attribute identities. Thus, for instance, a first attribute value can be indexed by a first entity identity and a first attribute identity while a second attribute value can be indexed by the first entity identity and a second attribute value. In an example, the first entity identity may be Babe Ruth, the first attribute identity may be height and the second attribute identity may be weight. Therefore, the first attribute value can be the height of Babe Ruth (6' 2") and the second attribute value can be the weight of Babe Ruth (e.g., 215 lbs.). Thus, a single entity identity may have multiple attributes corresponding thereto, and the relational database 500 can comprise attribute values for multiple entity identities. Accordingly, if one dimensional tables are located across web pages indexed by a search engine and contents thereof are extracted, and the entity identities are inferred for those one dimensional tables, the relational database 500 can include a relatively large amount of data.

Figure 6:
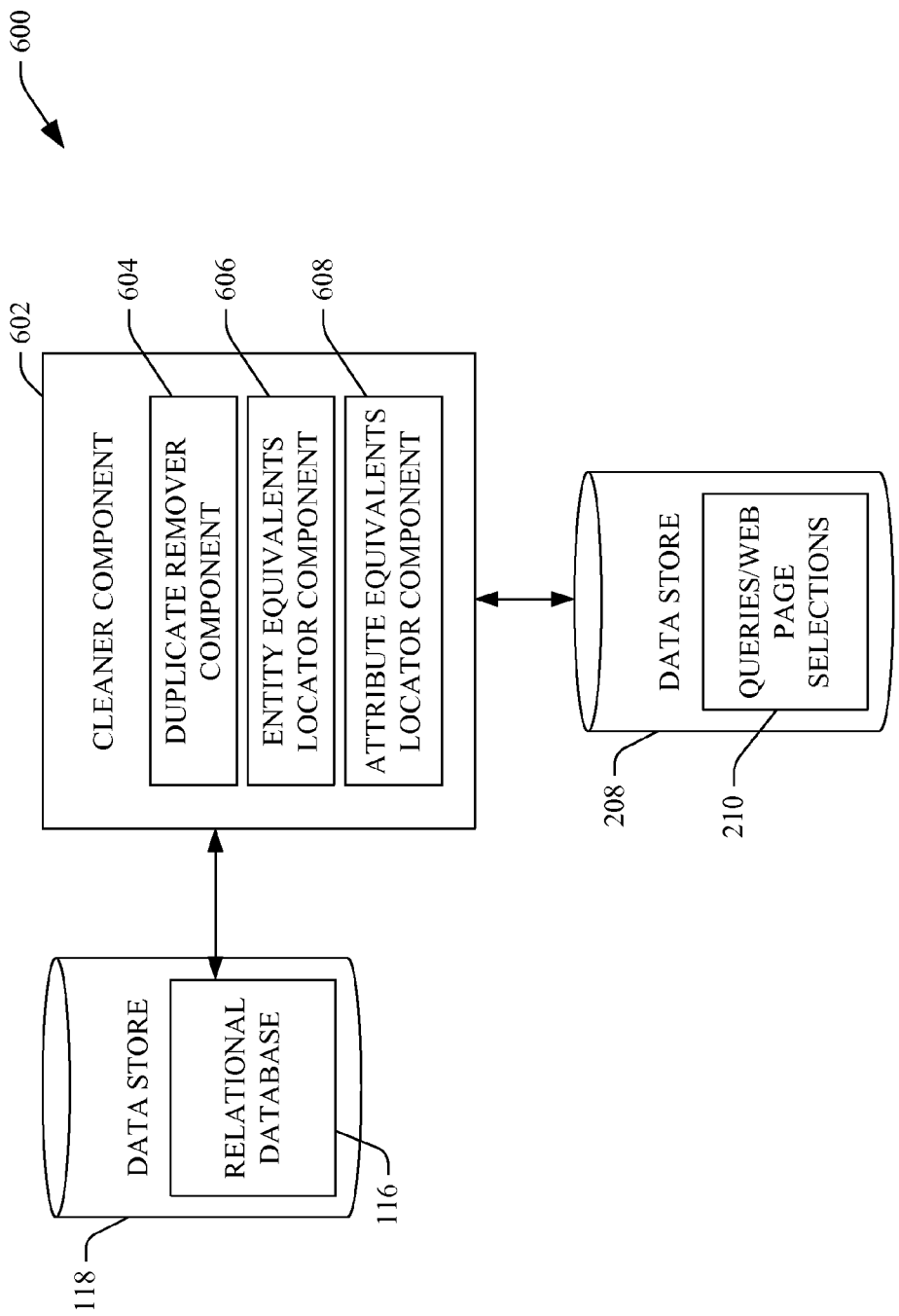
FIG. 6 is a functional block diagram of an exemplary system that facilitates cleansing a relational database.

Now referring to FIG. 6, an exemplary system 600 that facilitates cleaning contents of the relational database 116 retained in the data store 118 is illustrated. As described above, the relational database 116 can comprise a large number of entries. The system 600 may comprise a cleaner component 602 that can be configured to remove duplicate entries in the relational database 116, identify equivalent entity identities to those in the relational database 116, and identity equivalent attribute identities to those in the relational database 116. The cleaner component 602 comprises a duplicate remover component 604 that can remove duplicate entries from the relational database 116. For example, multiple web pages may relate to Babe Ruth and may have his height and weight described thereon. Therefore it can be ascertained that multiple entries can exist in the relational database 116 that have identical entity identities, attribute identities and attribute values. The duplicate remover component 604 can remove the duplicate entries to reduce the size of the relational database 116.

The cleaner component 602 may further comprise an entity equivalents locator component 606 that is configured to determine equivalent entity identities (including equivalent entity identities in the relational database 116 and entity identities not in the relational database 116). For instance, a single entity may have multiple entity identities corresponding thereto, wherein each entity identity refers to the same entity. For instance, the entity Babe Ruth can be identified by entity identities Babe Ruth, B. Ruth, George Ruth, George Herman Ruth, The Babe, etc. Therefore, a user that issues a fact lookup query pertaining to Babe Ruth may use any of such entity identities when performing the search. The entity equivalents locator component 606 can analyze the queries and web page selections 210 in the data store 208 to infer equivalent entity identities based upon previous queries issued by users to access certain web pages. Specifically, the entity equivalents locator component 606 can review queries issued by users of a search engine that are utilized to access a relatively small subset of web pages. For example, the queries "Babe Ruth" and "The Babe" are similar queries because users click on similar sets of result URLs for such queries. Accordingly, the entity equivalents locator component 606 can detect that the terms "The Babe" and "Babe Ruth" are equivalent identities.

The cleaner component 602 can further include an attribute equivalents locator component 608 that is configured to locate equivalent attribute identities. For instance, the attribute "date of birth" may be queried by users as "date of birth," "birth date," "DOB," etc. It is desirable to identify equivalent attribute identities to provide robust search coverage, such that if a first user issues the query "Babe Ruth's date of birth" and a second user issues the query "Babe Ruth's birth date," both queries will be recognized as fact lookup queries and a (same) correct answer to such fact lookup queries will be provided to both users. The attribute equivalents locator component 608 can, in an example, locate equivalent attributes by analyzing contents of the relational database 116. The attribute equivalents locator component 608 can search for an entity identity or entity identities that have substantially similar attribute values for different attribute identities. Since, for a single entity identity, it is highly unlikely that two different attributes will have the same value, it can be inferred that the attribute identities are equivalent attribute identities. In other words, if two attribute identities are often associated with the same value for a same entity, such attribute identities will be found to be equivalent by the attribute equivalents locator component 608.

Thus, in summary, the cleaner component 602 can modify the relational database 116 such that attribute values are indexed by different entity identities when such entity identities are equivalent and by different attribute identities when such attribute identities are equivalent.

Figure 7:
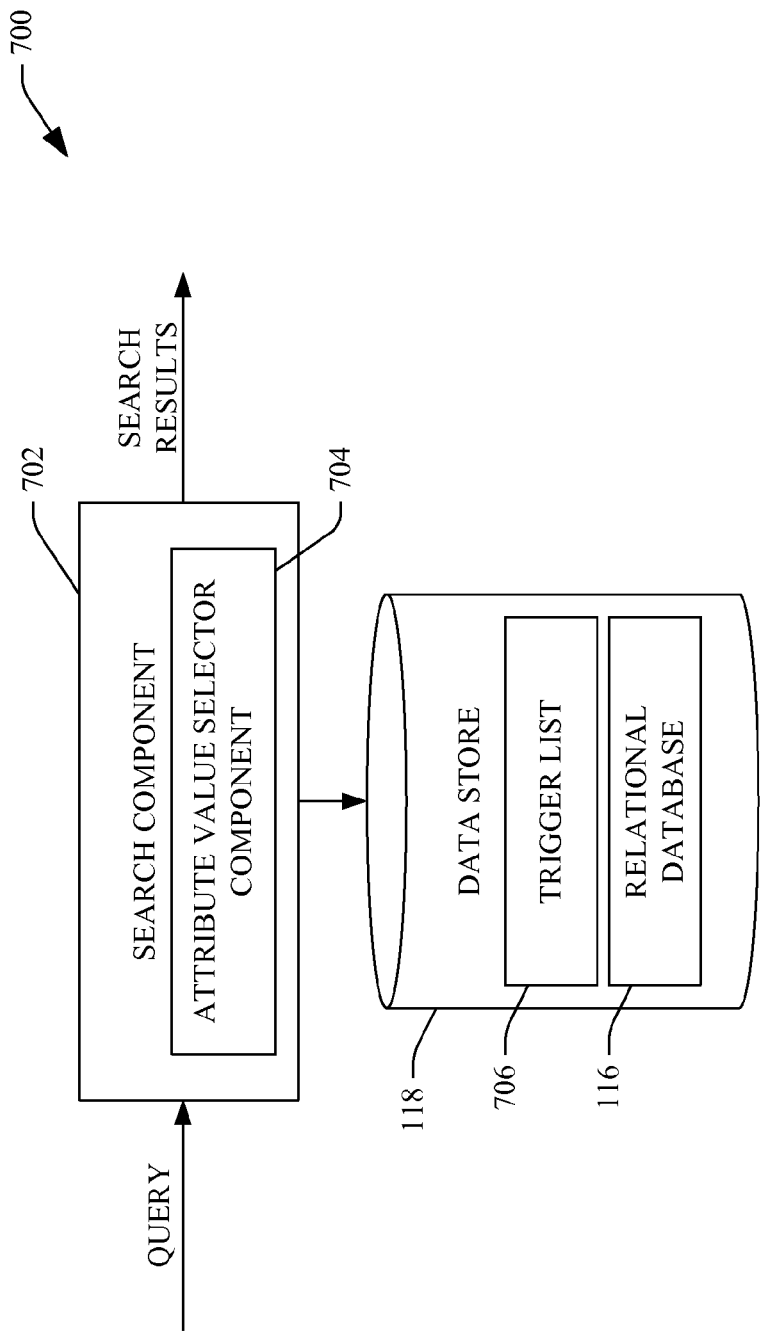
FIG. 7 is a functional block diagram of an exemplary system that facilitates receiving a fact lookup query and outputting an instant answer to such fact lookup query.

Referring now to FIG. 7, an exemplary system 700 that facilitates providing an attribute value to a user responsive to the user issuing a fact lookup query to the search engine is illustrated. The system 700 comprises a search component 702 which, in an example, may be a search engine and/or an algorithm utilized in a search engine. The search component 702 can receive a query that is issued by a user, wherein the query can be a fact lookup query. The search component 702 comprises an attribute value selector component 704 that selects an attribute value from the relational database 116 responsive to receipt of the query, wherein the attribute value is selected based at least in part upon an entity identity and attribute identity included in the query.

Pursuant to an example, the attribute value selector component 704 can analyze keywords in the query received by the search component 702 and can recognize that the query is a fact lookup query based at least in part upon the keywords of the query. Pursuant to an example, the system 700 may include the data store 118, which can comprise a trigger list 706. The trigger list 706 may be a list of entity identities and attribute identities that are supported by the search component 702. The attribute value selector component 704 can compare keywords in the query with entity identities and attribute identities in the trigger list 706. If the query does not include an attribute identity and entity identity that is in the trigger list 706, then the search component 702 can perform a conventional web search, as the query is most likely a transactional query or informational query. If, however, the attribute value selector component 704 finds that keywords in the query match an entity identity and attribute identity in the trigger list 706, then the attribute value selector component 704 can ascertain that the query is a fact lookup query and the attribute value selector component 704 can access the relational database 116.

As discussed above, the relational database 116 includes data extracted from multiple web pages. Different web pages describing the same attribute for the same entity may provide a different attribute value for such entities. For example, a first web page may indicate that the population of Ohio is 11.5 million, while a second web page may indicate that the population of Ohio is 11.54 million, while a third web page may indicate that the population of Ohio is 12 million. It may be desirable, however, to provide the issuer of the query with a single value rather than each different value for the entity and attribute of interest. Accordingly, the attribute value selector component 704 can be configured to select a particular attribute value to provide to the issuer of the query.

In an example, the attribute value selector component 704 can locate all attribute values that correspond to the entity identity and attribute identity in the query and can cluster these values into clusters, such that similar attribute values are grouped together. The attribute value selector component 704 may thereafter select the cluster that includes the greatest number of attribute values. The attribute value selector component 704 may then analyze the attribute values in the selected cluster and can select a single value from such cluster that has a highest average similarity with respect to other values in the selected cluster. The attribute value selector component 704 may then return the single value to the issuer of the query (e.g., as an instant answer).

Of course, the attribute value selector component 704 may use other techniques to select a single value for an identified entity and attribute. For instance, the attribute value selector component 704 may determine an average value across all attribute values for the entity identity and attribute identity included in the fact lookup query. This average value may then be returned to the user as the instant answer to the query. In yet another example, the attribute value selector component 704 can return the attribute value that appears most often in the relational database 116 in conjunction with the entity identity and attribute identity (or equivalents thereof) as an instant answer to the fact lookup query. Still further, the attribute value selector component 704 can be configured to output multiple attribute values to the user, wherein such multiple attribute values are extracted from different data sources. Thus, the issuer of the query can determine which source she believes is most reliable when determining or reviewing the attribute value.

From the above, it can be ascertained that the system 700 can provide an instant answer to a fact lookup query proffered by a user. This instant answer can be provided in line with search results provided to the user responsive to the user issuing the query. For instance, the instant answer can be provided most prominently and beneath such instant answer links to web pages corresponding to the query can be provided to the user.

Figure 8:
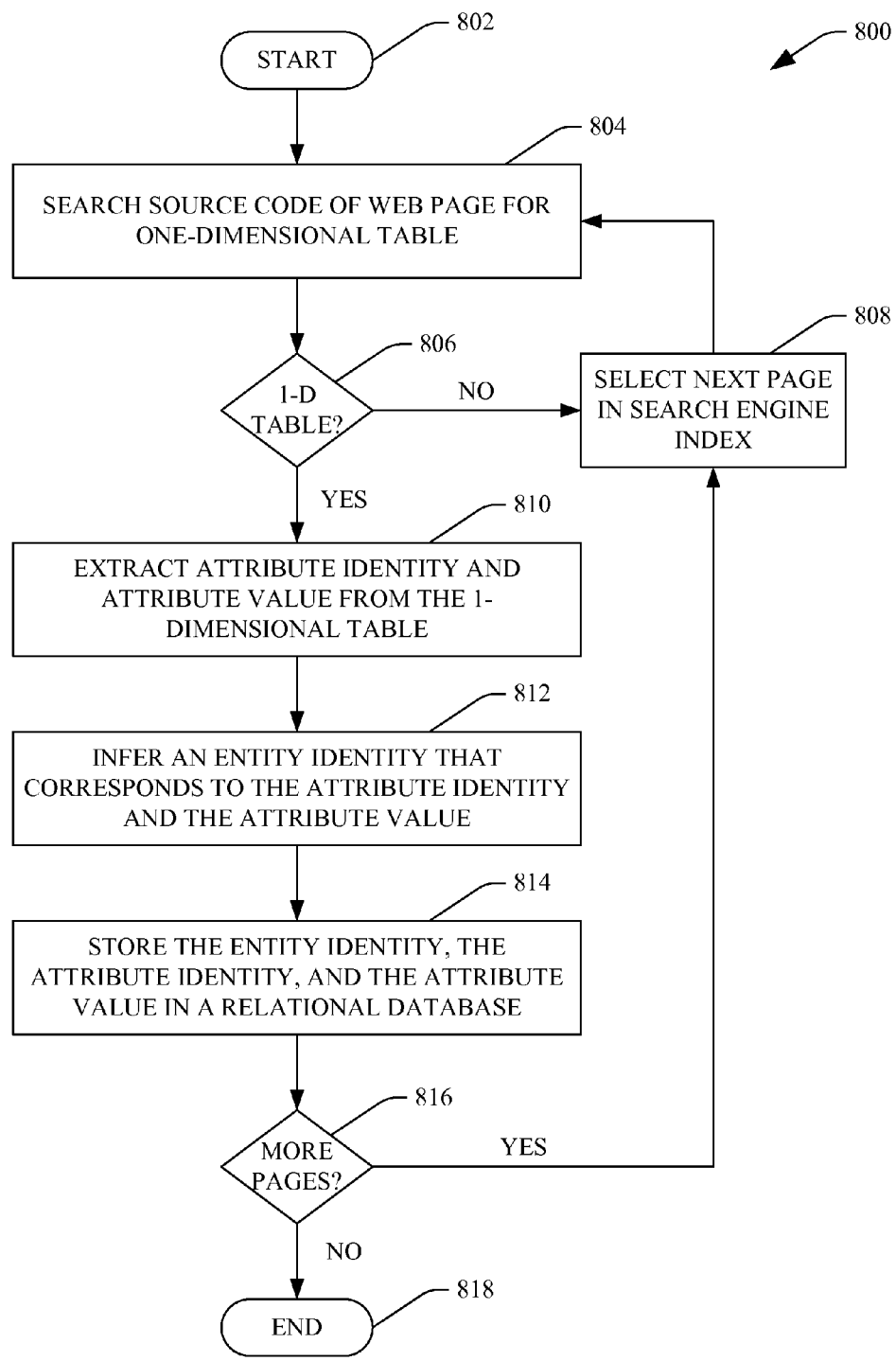
FIG. 8 is flow diagram that illustrates an exemplary methodology for generating a relational database that is configured for utilization in connection with answering fact lookup queries.
Figure 9:
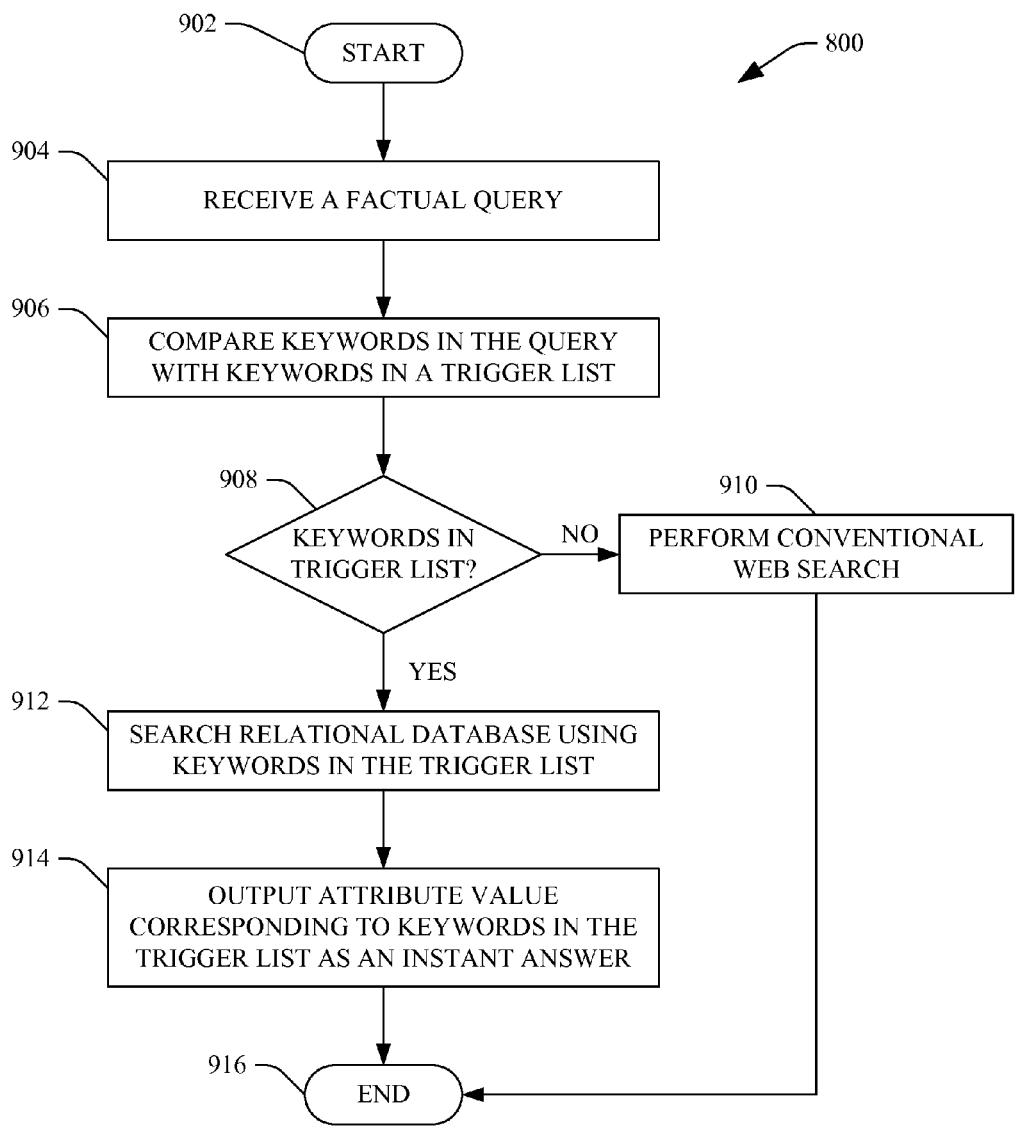
FIG. 9 is a flow diagram that illustrates an exemplary methodology for outputting an attribute value that corresponds to an attribute identity and entity identity provided by a user in a query.

With reference now to FIGS. 8-9, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be a non-transitory medium, such as memory, hard drive, CD, DVD, flash drive, or the like.

Referring now to FIG. 8, an exemplary methodology 800 that facilitates generating a relational database for utilization in answering fact lookup queries is illustrated. The methodology 800 begins at 802, and at 804 source code of a web page is searched for a one dimensional table. As described above, the one dimensional table includes an attribute identity and an attribute value but is free of an entity identity. At 806, a determination is made regarding whether the source code of the web page includes a one dimensional table. If it is determined at 806 that the source code of the web page does not include a one dimensional table, then the methodology 800 proceeds to 808 where a next web page in a search engine index is selected and the methodology returns to 804.

If at 806 it is determined that the web page includes a one dimensional table, then at 810 an attribute identity and an attribute value are extracted from the one dimensional table. At 812, an entity identity that corresponds to the attribute identity and the attribute value is inferred. The inference can be based upon previous queries submitted by users to access the web page, a known schema corresponding to the web page, or other data. At 814, the entity identity, the attribute identity and the attribute value are stored in a relational database. Specifically, the attribute value can be indexed by the entity identity and the attribute identity in the relational database. At 816, a determination is made regarding whether there are more web pages to be analyzed. If additional pages are to be analyzed, then the methodology returns to act 808, where a next web page in a search engine index is selected. If there are no further pages to select, the methodology 800 completes at 818.

Turning now to FIG. 9, an exemplary methodology 900 for outputting an instant answer to a fact lookup query is illustrated. The methodology 900 starts at 902, and at 904 a fact lookup query is received. For example, the fact lookup query can include an entity identity and an attribute identity.

At 906, keywords in the query are compared with keywords in a trigger list. The keywords in the trigger list comprise entity identities and attribute identities. At 908, a determination is made regarding whether keywords in the fact lookup query are included in the trigger list. If the fact lookup query does not include an entity identity and attribute identity in the trigger list, then at 910 a conventional web search is performed. If the received query includes an entity identity and attribute identity in the trigger list, then the received query is a fact lookup query and at 912 a relational database can be searched through utilization of the keywords in the trigger list.

At 914, an attribute value that corresponds to the entity identity and attribute identity in the received query are output to the user as an instant answer. That is, the instant answer can be displayed prominently on a search results page. Furthermore, a conventional search can also be undertaken such that search results are shown beneath the instant answer. The methodology 900 completes at 916.

Figure 10:
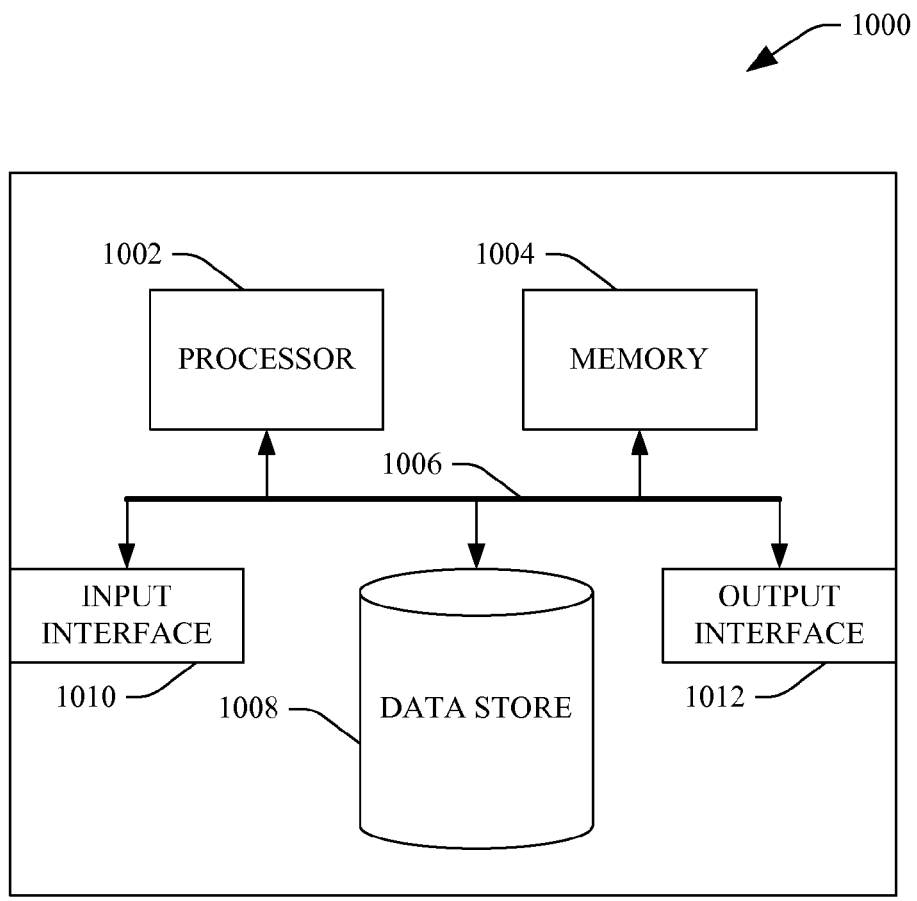
FIG. 10 is an exemplary computing system.

Now referring to FIG. 10, a high-level illustration of an exemplary computing device 1000 that can be used in accordance with the systems and methodologies disclosed herein is illustrated. For instance, the computing device 1000 may be used in a system that supports building a relational database for utilization in answering fact lookup queries. In another example, at least a portion of the computing device 1000 may be used in a system that supports answering fact lookup queries subsequent to receipt of a fact lookup query. The computing device 1000 includes at least one processor 1002 that executes instructions that are stored in a memory 1004. The memory 1004 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store a relational database that comprises entity identities, attribute identities and attribute values, a trigger list that comprises entity identities, attribute identities, etc.

The computing device 1000 additionally includes a data store 1008 that is accessible by the processor 1002 by way of the system bus 1006. The data store 1008 may be or include any suitable computer-readable storage, including a hard disk, memory, etc. The data store 1008 may include executable instructions, web pages indexed by a search engine, source code of web pages, a trigger list, a relational database, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

Additionally, while illustrated as a single system, it is to be understood that the computing device 1000 may be a distributed system. Thus, for instance, several devices may be in communication by way of a network connection and may collectively perform tasks described as being performed by the computing device 1000.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A computer-executable method comprising:
generating a computer-readable index, wherein the index comprises:
identities of entities;
identities of attributes for the entities; and
values for the attributes, wherein the values for the attributes are indexed in the computer-readable index by the identities of the entities and the identities of the attributes, and wherein generating the computer-readable index comprises:
accessing a page, the page comprises a table and a title of the page, the table comprises an identity of an attribute of an entity and a value of the attribute for the entity, wherein the table fails to include an identity of the entity;
identifying the table in source code of the page;
extracting the identity of the attribute and the value of the attribute from the source code of the page;
responsive to identifying the table in the source code of the page, inferring the identity of the entity, wherein inferring the identity of the entity comprises inferring that the identity of the entity includes a keyword in a title of the page; and
in the computer-readable index, indexing the value of the attribute by the identity of the entity and the identity of the attribute.

2. The computer-executable method of claim 1, wherein inferring the identity of the entity comprises:
accessing a computer-implemented click graph, wherein the computer-implemented click graph identifies queries issued to a search engine to retrieve the page, wherein the queries each comprise the keyword;
comparing the keyword with keywords in the title of the page, wherein the identity of the entity is inferred based upon the keyword being in both the computer-implemented click graph and the title of the page.

3. The computer-executable method of claim 1, wherein inferring the identity of the entity comprises:
accessing a known schema for the page, wherein the identity of the entity is inferred based upon the known schema for the page.

4. The computer-executable method of claim 1, wherein generating the computer-readable index further comprises performing the acts of accessing, identifying, extracting, inferring, and indexing for a plurality of pages in a search engine index.

5. The computer-executable method of claim 1, wherein generating the computer-readable index further comprises performing the acts of accessing, identifying, extracting, inferring, and indexing for multiple pages.

6. The computer-executable method of claim 5, further comprising locating equivalent entity identities in the computer-readable index, wherein the equivalent entity identities are non-identical entity identities that refer to a same entity.

7. The computer-executable method of claim 5, further comprising locating equivalent attribute identities in the computer-readable index, wherein the equivalent attribute identities are non-identical attribute identities that refer to a same attribute.

8. The method of claim 5, further comprising:
receiving a query, wherein the query comprises the identity of the entity and the identity of the attribute;
searching the computer-readable index utilizing the identity of the entity and the identity of the attribute; and
outputting the value of the attribute for display on a display screen based upon the searching of the computer-readable index.

9. The method of claim 8, wherein the value of the attribute is output as an instant answer in a search engine and is displayed together with search results for the query.

10. The method of claim 5, further comprising:
receiving a query, wherein the query comprises the identity of the entity and the identity of the attribute;
using the query, locating multiple attribute values that correspond to the identity of the entity and the identity of the attribute in the computer-readable index, the multiple attribute values comprise the value of the attribute; and
selecting the value of the attribute from the multiple attribute values for display on a display.

11. The method of claim 10, wherein selecting the value of the attribute from the multiple attribute values comprises:
clustering the multiple attribute values into a plurality of clusters as a function of similarity of the attribute values to one another;
selecting a cluster with a greatest number of attribute values assigned thereto, the value of the attribute included in the cluster; and
selecting the value of the attribute based upon an average similarity of the value of the attribute with respect to other values in the cluster.

12. A system comprising:
at least one processor; and
memory that comprises instructions that, when executed by the at least one processor, cause the at least one processor to generate a computer-readable index, wherein generating the computer-readable index comprises:
locating a table in source code of a page, the table comprises an attribute identity of an entity and an attribute value for the attribute identity and the entity, wherein the table is free of an identity of the entity;
responsive to locating the table in the source code of the web page, inferring the identity of the entity, wherein inferring the identity of the entity comprises:
determining that a title of the page and a header of the page comprise a same keyword; and
inferring that the keyword is at least a portion of the identity of the entity based upon the keyword being included in both the title of the page and the header of the page; and
responsive to inferring the identity of the entity, in the computer-readable index, indexing the attribute value by the entity identity and the attribute identity.

13. The system of claim 12, wherein inferring the identity of the entity further comprises:
performing a comparison between queries issued to a search engine to locate the page and keywords in at least one of the title, the header, or content of the page; and
inferring the entity identity based upon the comparison.

14. The system of claim 12, wherein the page belongs to a domain with other pages, and wherein inferring the identity of the entity further comprises:
receiving data indicative of a known schema for pages belonging to the domain; and
inferring the identity of the entity based upon the known schema.

15. The system of claim 12, wherein the instructions, when executed by the at least one processor, further cause the at least one processor to:
identify multiple identities of the entity that refer to the entity; and
update the computer-readable index to indicate that the multiple identities refer to the entity.

16. The system of claim 12, wherein the instructions, when executed by the at least one processor, further cause the at least one processor to:
identify multiple attribute identities that refer to the attribute; and
update the computer-readable index to indicate that the multiple attribute identities refer to the attribute.

17. The system of claim 12, wherein the instructions, when executed by the at least one processor, further cause the at least one processor to:
locate the identity of the entity and the attribute identity in the relational database based upon a received query, wherein the query comprises the identity of the entity and the attribute identity; and
return the attribute value for the entity responsive to receipt of the query.

18. The system of claim 17, wherein the attribute value is output on a web page of a search engine as an instant answer to the query.

19. Computer-readable memory comprising instructions that, when executed by a processor, cause the processor to perform acts comprising:
generating a computer-readable index that indexes attribute values by entity identities and attribute identities, wherein generating the computer-readable index comprises:
receiving source code of a page, wherein the source code of the page comprises a one-dimensional table, and wherein the one-dimensional table comprises an identity of an attribute and a value of the attribute for an entity, wherein the one dimensional table fails to include an identity of the entity;
comparing queries with at least one of a title of the page, a header of the page, or a body of the page, each of the queries comprise a same keyword, each of the queries issued by users of a search engine to access the page;
determining that the keyword is included in at least one of the title of the page, the header of the page, or the body of the page based upon the comparing;
inferring the identity of the entity based upon the keyword being included in the at least one of the title of the page, the header of the page, or the body of the page; and
indexing the value of the attribute by the identity of the entity and the identity of the attribute in the computer-readable index.

20. The computer-readable memory of claim 19, the acts further comprising:
receiving a query, the query includes the identity of the attribute and the identity of the entity;

identifying the value of the attribute in the computer-readable index based upon the identity of the attribute and the identity of the entity; and returning the value of the attribute as an instant answer to the query.

\* \* \* \* \*